United States Patent
Warren

(10) Patent No.: US 6,332,120 B1
(45) Date of Patent: Dec. 18, 2001

(54) BROADCAST SPEECH RECOGNITION SYSTEM FOR KEYWORD MONITORING

(75) Inventor: Robert L. Warren, Cardiff, CA (US)

(73) Assignee: Solana Technology Development Corporation, San Diego, CA (US)

( * ) Notice: Subject to any disclaimer, the term of this patent is extended or adjusted under 35 U.S.C. 154(b) by 0 days.

(21) Appl. No.: 09/294,865

(22) Filed: Apr. 20, 1999

(51) Int. Cl.[7] .............. G10L 15/00; G10L 15/26
(52) U.S. Cl. ............ 704/235; 704/251; 704/270
(58) Field of Search ................... 704/235, 251, 704/270

(56) References Cited

U.S. PATENT DOCUMENTS

| | | | |
|---|---|---|---|
| 5,051,924 | * | 9/1991 | Bergeron et al. ............ 704/200 |
| 5,168,548 | * | 12/1992 | Kaufman et al. ............ 704/200 |
| 5,231,670 | * | 7/1993 | Goldhor et al. ............ 704/275 |
| 5,481,296 | * | 1/1996 | Cragun et al. ............ 348/13 |
| 5,561,457 | * | 10/1996 | Cragun et al. ............ 348/13 |
| 5,612,729 | * | 3/1997 | Ellis et al. ............ 348/2 |
| 5,664,227 | * | 9/1997 | Mauldin et al. ............ 395/778 |
| 5,859,662 | * | 1/1999 | Cragun et al. ............ 348/13 |
| 5,970,448 | * | 10/1999 | Goldhor et al. ............ 704/235 |
| 6,011,854 | * | 1/2000 | Van Ryzin ............ 381/77 |
| 6,061,056 | * | 5/2000 | Menard et al. ............ 345/327 |
| 6,125,347 | * | 9/2000 | Cote et al. ............ 704/275 |

FOREIGN PATENT DOCUMENTS

10028068 * 1/1998 (JP) ............... G06F/17/30

* cited by examiner

*Primary Examiner*—Talivaldis I. Smits
(74) *Attorney, Agent, or Firm*—Barry R. Lipsitz

(57) ABSTRACT

Broadcast audio is automatically monitored for information of interest. A computer processor has a memory associated therewith for storing a vocabulary of keywords of interest. An audio receiver receives an audio broadcast. A speech recognition system associated with the audio receiver and computer processor detects when one of the keywords appears in a received audio segment. A report generator associated with the computer processor and responsive to the detection of a keyword generates a report detailing the detected keyword and its context. The system is particularly well suited to the verification of commercial messages and to assist in public relations efforts.

36 Claims, 2 Drawing Sheets

BROADCAST SPEECH RECOGNITION SYSTEM FOR KEYWORD MONITORING

BACKGROUND OF THE INVENTION

The present invention relates to content verification techniques in the broadcast industry, and in particular to methods and apparatus for monitoring airplay (i.e., radio and television broadcasts) using a speech recognition (SR) (also referred to herein as "voice recognition" or "VR") system.

Today's media environment provides an almost limitless set of outlets to reach consumers. The content is much as it has been for decades, i.e., advertising, programs, music, and news. What has changed dramatically is that the geographical stratification (e.g., national, regional, local) has been blurred. Particularly true of news, alerts, and commentaries, this blurring means that information is disseminated more quickly than ever. The rapid expansion of media outlets, including radio, television, cable, and the Internet, are proving to be a boon in terms of reaching consumers with information. This has many useful implications, including cost competition to reach an ever-fractionalized marketplace.

All of this calls for an effective and cost-efficient means for monitoring broadcasts that differs from existing systems. Existing systems rely on either (i) passive pattern matching, particularly in the case of music, or (ii) the use of an embedded signal. In the latter instance, a unique signal is encoded into transmitted information ("content") such that the signal can be monitored to verify play. For example, a radio advertisement ("commercial") can include an inaudible signal that is monitored by a special receiver. The receiver detects the inaudible signal to verify that the commercial has been played at the proper time. Each of the existing systems noted above has relative advantages and disadvantages. A common disadvantage of both, however, is that they are not able to intercept spontaneous comments (e.g., impromptu statements made by newscasters), live news feeds, or other such content.

It would be advantageous to provide a method and apparatus for improving the tracking of spoken information that is broadcast to a population of receivers, e.g., over the airwaves, on cable, over the Internet, or the like. It would be further advantageous to provide a cost-effective means for tracking broadcast channels for specific words, phrases, and contexts of these.

The present invention provides a method and apparatus having the aforementioned and other advantages. In particular, the present invention enables specific words and phrases to be automatically detected such that the information can serve numerous purposes. For example, novel services can be offered by providing automated tracking of advertising, newscasts, and programs. In this manner, a cost-effective system is provided for, e.g., tracking public relations efforts, localizing news stories, as well as enabling simple verification of airplay of contracted materials. The invention uses voice recognition technology to achieve these and other objectives.

SUMMARY OF THE INVENTION

In accordance with the invention, a method is provided for monitoring broadcast audio for information of interest. A vocabulary of keywords of interest is provided. Received audio is processed using a voice recognition system to detect when one of the keywords appears in the audio. A report is generated based on the detection of a keyword.

In an illustrated embodiment, successive portions of the audio are stored for processing during the processing step. Portions of the stored audio adjacent detected keywords are analyzed to ascertain the context in which the keywords are used. Portions of audio before and after the occurrence of a keyword can be stored for the context analysis. The context can be used to determine an action taken in response to the detection of the keyword. For example, the action can comprise an alert when the context comprises a crisis (e.g., an emergency or an unexpected problem that needs to be quickly resolved).

A portion of audio adjacent a detected keyword can be stored for inclusion with the report as an audio clip. In this manner, a person receiving the report can also hear the detected keyword in context within a segment of received audio. Preferably, portions of audio before and after the occurrence of the detected keyword will be stored for inclusion in the audio clip.

In accordance with the invention, the type of audio program received can also be detected. For example, the program may be a talk show, news broadcast, editorial, commercial advertisement, or other audio segment. Information identifying the audio program type can then be provided in the report. Moreover, the amount of audio stored for context analysis can be based on the type of audio program received.

In another embodiment, broadcast audio is received and input to a voice recognition system. The voice recognition system converts speech portions of the received audio to text. The text is analyzed using a computer to locate at least one predetermined keyword therein. A report is then generated in response to the analyzing step upon the occurrence of the at least one keyword.

In such an embodiment, successive portions of the text can be stored for processing during the analyzing step. Portions of the stored text adjacent the at least one keyword are analyzed to ascertain a context in which the keyword was used. Preferably, portions of text both before and after the occurrence of the keyword are stored for the context analysis.

Apparatus in accordance with the invention includes a computer processor. A memory associated with the computer processor stores a vocabulary of keywords of interest. An audio receiver provides received audio to a voice recognition system that is also associated with the computer processor. The voice recognition system detects when one of the keywords appears in audio received by the audio receiver. A report generator associated with the computer processor is responsive to the detection of a keyword for generating a report. The report is indicative of the detected keyword and, when implemented, the context in which the keyword was used.

The report generator can be provided locally or at a central processing station remote from the computer processor, audio receiver and voice recognition system. In the event that the report generator is located at a remote (e.g., central) location, the computer processor communicates with the report generator via a communications network.

The computer processor can be provided with the capability of analyzing the context in which detected keywords are used. In such cases, the report generator can be responsive to the context analysis for generating the report.

In an alternate embodiment, the voice recognition system converts the audio to text. The keyword detection is then provided by comparing words in the text to words in the stored keyword vocabulary.

DETAILED DESCRIPTION OF THE INVENTION

The present invention provides the ability to intercept and log spontaneous comments, live news feeds, and other such content from, e.g., television, radio and Internet audio broadcasts. More particularly, the invention relies on the detection of specific spoken words to provide a means for tracking what is said. Applications for the invention include tracking specific news stories and crisis management applications. Both can be considered in terms of public relations (PR) activities.

In the first case, a news release may have been issued and the PR firm is interested in understanding how well the story is reported. In the second, a product manufacturer may want to monitor news reports for any occurrence of a product name that could be associated with a negative story. Knowledge of this at the earliest possible opportunity could provide time for preparing a response or taking specific action. As an example, if a manufacturer's product were tampered with (such as the famous Tylenol® capsule tampering), an early warning of radio/television news stories could be provided using the invention, enabling the manufacturer and its PR experts to address the public relations problem more effectively.

Implementations of the invention can range from basic to advanced. Although a basic system description is provided herein for purposes of example, it should be appreciated that many other implementations can be provided with more advanced features.

There are several key elements to the inventive broadcast voice recognition (BVR) system. These are:

1. the reception of a broadcast audio segment or stream;
2. a voice recognition system for monitoring the audio segment or stream; and
3. a reporting system for generating reports, either electronically or in print, identifying the occurrence of specific words that are of interest.

Additionally, the BVR system may include a 'vocabulary' of specific words or phrases to be monitored. This may be particularly important for systems that are unable to perform voice recognition upon continuous streams of speech.

Figure 1:
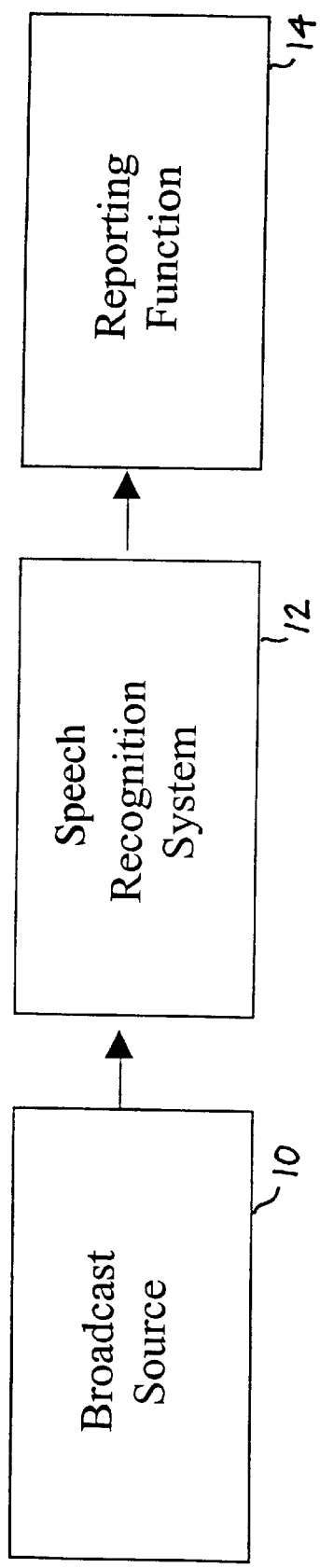
FIG. 1 is a block diagram of the broadcast voice recognition monitoring system of the invention.

FIG. 1 is a schematic diagram of the basic system. A broadcast source 10 provides an audio stream to a voice recognition (VR) system 12. The VR system 12 can be implemented in a personal computer or the like, as well known in the art. In a preferred embodiment, an audio memory is provided in the voice recognition system 12 to store portions of the audio stream. A vocabulary of keywords of interest is also maintained in the voice recognition system 12. The vocabulary can be stored, for example, in a memory such as a well known read only memory (ROM), nonvolatile random access memory (RAM), or on a magnetic or optical disk drive. The VR system operates against the stream of audio such that if one of the keywords is detected, an audio segment before and an audio segment after the keyword is preserved and passed to a reporting function 14. The stored audio segments provide a "context" for the keyword.

In the preferred embodiment, a vocabulary is provided locally for each monitoring site. This vocabulary is tailored to a select set of words based on client needs, and serves as a first level of screening of words. The context of the keyword is then used to determine the nature of the use of the keyword.

The context of keywords can serve as an important part of the overall BVR system. First, the context can provide a means for validating the general use of the keyword. For example, using the words in the context can help to distinguish between a national restaurant chain and a local plumbing company with the same common name (e.g., "Smith's").

Further, the context can be used to determine what action is to be taken. As an example, if the keyword is linked in the context to a select list of unfavorable words (e.g., crisis, epidemic) an alert report can be issued. This alert report can be in any one of a number of forms, such as e-mail, an electronic message, fax, or other means.

For purposes of the present disclosure, an example implementation is provided based on a distributed BVR network and an application of crisis notification. Consider, for purposes of this example, a network of monitoring stations located throughout various media markets. These stations will provide a means for tuning to selected radio, television, cable, or world-wide-web (www) channels such that an audio track can be provided to a processing element. The processing element will include a voice recognition capability.

Figure 2:
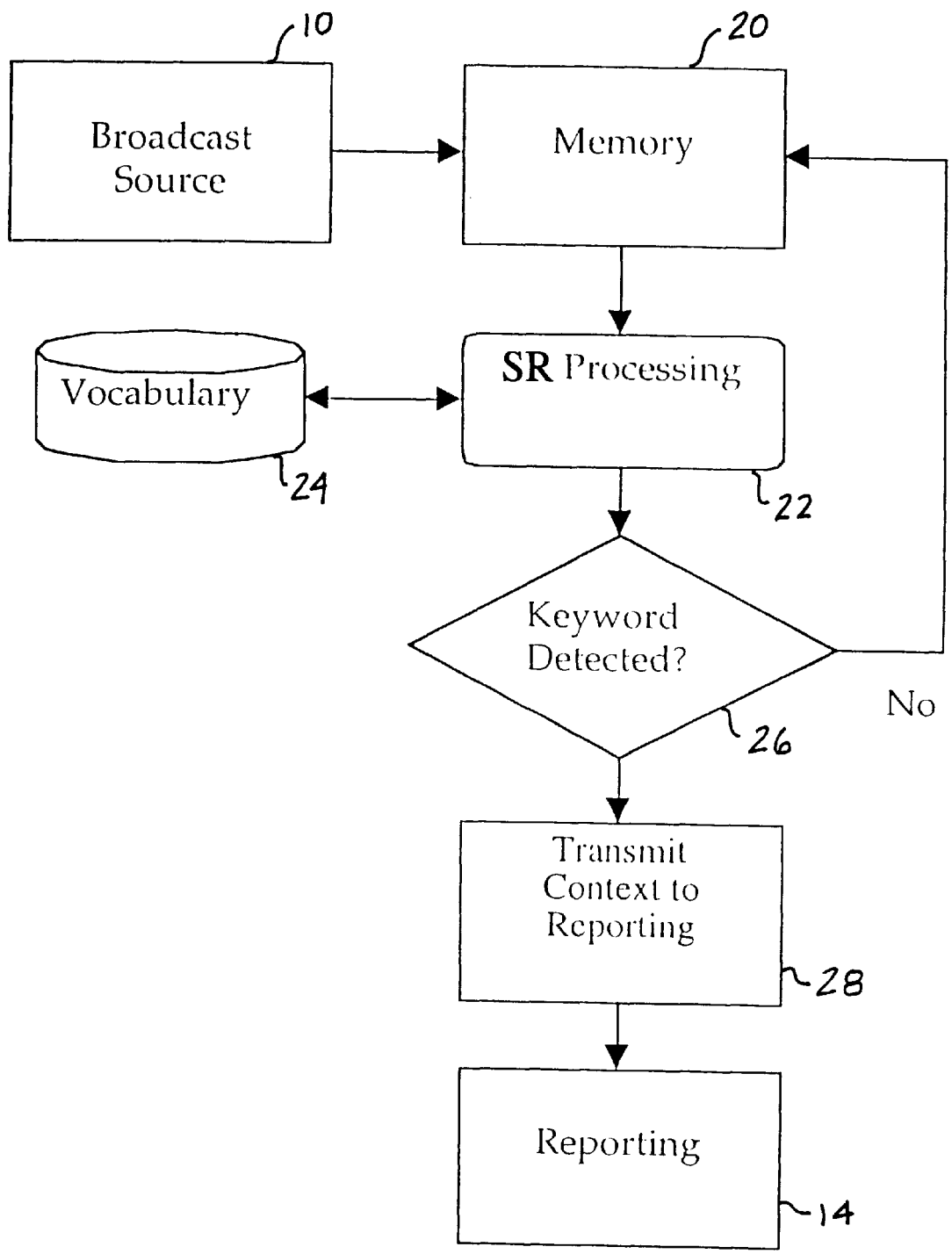
FIG. 2 is a flowchart illustrating an example implementation of the invention.

As a part of the processing element, and as illustrated in FIG. 2, a first-in/first-out (FIFO) memory 20 maintains, e.g., sixty seconds of audio. The audio is maintained in a manner that allows the VR processing to operate in the middle of the stream, such that the stored audio is effectively, e.g., thirty seconds before the VR point and, e.g., thirty seconds after. The VR processing relies on a local, limited vocabulary 24 to locate specific keywords. These keywords are specific entries in the vocabulary and are maintained and updated by local or remote means. For example, the keywords can be entered locally through a keyboard, microphone, or other user interface. Alternatively, the keywords can be transmitted to the voice response system over the Internet, a private LAN or WAN, or by other wired or wireless communication. In yet another embodiment, the keywords are supplied on a suitable media such as magnetic disk, optical disk, ROM chip or the like as well known in the art.

As the broadcast audio is processed through the VR processing 22, if a keyword is detected (box 26), the context is shipped to a secondary memory element 28. Further VR processing of this context is then done to provide a text version of the entire context as indicated at box 28. This context is then sent to the reporting function 14, which can comprise, for example, computer software and a printer that generates and prints a written report.

The reporting function in the present example formats the entire context together with an identification of the source (i.e., station number), the time, and the date into a single message that is transmitted to a central data center. Optionally, the context could be also sent directly to a client with the interest in the keyword.

Various additional features can also be provided as part of the present invention. For example, a secondary list may be used to further substantiate the context of a keyword. This list may include specific words, like "crisis", "epidemic", and others that, when in combination with keywords, can cause an alert to be established.

In another implementation, the voice stream may be continuously turned into text. In this case, all processing, whether context determination or other analysis, can be performed on the text rather than in the audio domain.

The 'broadcast source' can be a live transmission or a recording of a live transmission. This will allow for post-broadcast analysis of segments. Moreover, reporting can take place through a centralized function, from a distributed network, or using a combination of these.

Each system can have a different architecture such that a single VR section can be used against multiple broadcast sources, including buffered memory of various sources.

In a further embodiment, the local monitoring site may send all of the audio to a central location for further determination of context. The stream of audio can also be shipped to a central location for VR analysis and reporting. Multiple languages can be supported with the same VR subsystem or elsewhere in a connected network.

The audio itself may be provided as part of the report. This may be offered instead of or in combination with a text report and may comprise an audio clip in standard or compressed form.

The information from the BVR system can also be combined with other information, whether from an active monitoring system or other database information to determine the occurrence of a particular audio segment. An example is to relate VR identified information with a program database (or other identification means). In this manner, one can determine if the audio segment of interest occurred during a newscast, editorial, talk show, or other program.

The context can be varied for each site, keyword, or level of service. That is, for some cases the context may be, for example, +/− thirty seconds, while for others a period of, e.g., +/− two minutes may be appropriate.

It should now be appreciated that the present invention provides a system for monitoring audio broadcasts for items of interest in a unique manner. In particular, a voice recognition system is used to identify content of interest within a real-time audio program. Keyword detection is advantageously used in order to recognize audio of interest. The context in which the detected audio is used is also determined. Reports are generated in text and/or audio detailing the detected audio content of interest.

Although the invention has been described in connection with various preferred embodiments, it should be appreciated that numerous adaptations and modifications may be made thereto without departing from the scope of the invention as set forth in the claims.

What is claimed is:

1. A method for monitoring broadcast audio for information of interest comprising the steps of:
    providing a vocabulary of keywords of interest;
    receiving said broadcast audio;
    processing the received audio using a speech recognition system to detect when one of said keywords appears in the audio; and
    automatically generating a written report based on the detection of said one of said keywords;
    wherein said written report provides at least one of airplay verification and tracking of public relations matters relating to said keywords of interest.

2. A method in accordance with claim 1 comprising the further steps of:
    storing successive portions of said audio for processing during said processing step; and
    analyzing portions of the stored audio adjacent a detected keyword to ascertain a context in which the keyword was used.

3. A method in accordance with claim 2 wherein portions of audio before and after the occurrence of said keyword are stored for the context analysis.

4. A method in accordance with claim 2 wherein said context is used to determine an action taken in response to the detection of said keyword.

5. A method in accordance with claim 4 wherein said action comprises an alert when said context comprises a crisis.

6. A method in accordance with claim 1 comprising the further step of storing a portion of said audio adjacent a detected keyword for inclusion with said report as an audio clip.

7. A method in accordance with claim 6 wherein portions of audio before and after the occurrence of said keyword are stored for inclusion in said audio clip.

8. A method in accordance with claim 1 comprising the further steps of:
    ascertaining a type of audio program received; and
    including information identifying the audio program type in said report.

9. A method in accordance with claim 8 comprising the further steps of:
    storing successive portions of said audio for processing during said processing step;
    analyzing portions of the stored audio adjacent a detected keyword to ascertain a context in which the keyword was used; and
    adjusting the amount of successive portions of said audio stored based on the type of audio program received.

10. A method in accordance with claim 1, wherein said written report provides both said airplay verification and said tracking of public relations matters.

11. A method for monitoring broadcast audio for information of interest comprising the steps of:
    receiving said broadcast audio;
    inputting the received audio to a speech recognition system, said speech recognition system converting speech portions of said received audio to text;
    analyzing said text with a computer to locate at least one predetermined key word in the text; and
    automatically generating a written report in response to said analyzing step upon the occurrence of said at least one key word;
    wherein said written report provides at least one of airplay verification and tracking of public relations matters relating to said keywords of interest.

12. A method in accordance with claim 11 comprising the further steps of:
    storing successive portions of said text for processing during said analyzing step; and
    analyzing portions of the stored text adjacent said at least one keyword to ascertain a context in which the keyword was used.

13. A method in accordance with claim 12 wherein portions of text before and after the occurrence of said keyword are stored for the context analysis.

14. A method in accordance with claim 12 wherein said context is used to determine an action taken in response to the detection of said keyword.

15. A method in accordance with claim 14 wherein said action comprises an alert when said context comprises a crisis.

16. A method in accordance with claim 11 comprising the further steps of:
    ascertaining a type of audio program received; and
    including information identifying the audio program type in said report.

17. A method in accordance with claim 11, wherein said written report provides both said airplay verification and said tracking of public relations matters.

18. Apparatus for monitoring broadcast audio for information of interest comprising:
    a computer processor;
    a memory associated with said computer processor for storing a vocabulary of keywords of interest;

an audio receiver;

a speech recognition system associated with said audio receiver and said computer processor for detecting when one of said keywords appears in audio received by said audio receiver; and a report generator associated with said computer processor and responsive to the detection of said one of said keywords, for automatically generating a written report indicative of said detection;

wherein said written report provides at least one of airplay verification and tracking of public relations matters relating to said keywords of interest.

19. Apparatus in accordance with claim 18 wherein:

said report generator is provided at a central processing station remote from said computer processor, audio receiver and speech recognition system; and said computer processor communicates with said report generator via a communications network.

20. Apparatus in accordance with claim 18 wherein:

said computer processor analyzes a context in which detected keywords are used; and said report generator is responsive to the context analysis for generating said report.

21. Apparatus in accordance with claim 18 wherein:

said speech recognition system converts said audio to text; and said keyword detection is provided by comparing words in said text to words in the stored keyword vocabulary.

22. A method in accordance with claim 18, wherein said written report provides both said airplay verification and said tracking of public relations matters.

23. A method for monitoring broadcast audio for information of interest, comprising the steps of:

providing at least one monitoring station that receives broadcast audio;

providing a plurality of keywords of interest;

providing a central processing station that is remote from the at least one monitoring station; and at the at least one monitoring station, receiving the respective broadcast audio, processing the received audio using a speech recognition system to detect when one of said keywords appears in the received audio, and informing the central processing station by automatically generating and sending a written report when one of said keywords is detected;

wherein said written report provides at least one of airplay verification and tracking of public relations matters relating to said keywords of interest.

24. A method in accordance with claim 23, wherein:

a plurality of monitoring stations that receive respective different broadcast audio are provided; and each monitoring station receives the respective broadcast audio, processes the respective received audio using a speech recognition system to detect when at least one of said keywords appears in the respective received audio, and informs the central processing station when the at least one of said keywords is detected.

25. A method in accordance with claim 24, wherein:

the monitoring stations are provided in respective different media markets.

26. A method in accordance with claim 23, wherein:

the central processing station remotely updates the keywords used at the at least one monitoring station.

27. A method in accordance with claim 23, wherein:

the at least one monitoring station sends an audio clip to the central processing station when the at least one of said keywords is detected for context analysis of the audio clip thereat.

28. A method in accordance with claim 23, wherein:

the at least one monitoring station informs the central processing station when the at least one of said keywords is detected via a report.

29. A method in accordance with claim 23, wherein said written report provides both said airplay verification and said tracking of public relations matters.

30. An apparatus for monitoring broadcast audio for information of interest, comprising:

at least one monitoring station that receives broadcast audio;

a computer processor located at each of said monitoring stations;

a memory associated with said computer processor for storing a plurality of keywords of interest;

an audio receiver located at each of said monitoring stations;

a speech recognition system associated with each of said monitoring stations; and a central processing station that is remote from the at least one monitoring station; wherein:

the respective broadcast audio is received at the at least one monitoring station;

the respective broadcast audio is processed using the speech recognition system to detect when one of said keywords appears in the received audio; and the monitoring station informs the central processing station by automatically generating and sending a written report when one of said keywords is detected;

wherein said written report provides at least one of airplay verification and tracking of public relations matters relating to said keywords of interest.

31. An apparatus in accordance with claim 30, further comprising:

a plurality of monitoring stations that receive respective different broadcast audio; wherein:

each monitoring station receives the respective broadcast audio, processes the respective received audio using a speech recognition system to detect when at least one of said keywords appears in the respective received audio, and informs the central processing station when the at least one of said keywords is detected.

32. An apparatus in accordance with claim 31, wherein:

the monitoring stations are provided in respective different media markets.

33. An apparatus in accordance with claim 30, wherein:

the central processing station remotely updates the keywords used at the at least one monitoring station.

34. An apparatus in accordance with claim 30, wherein:

the at least one monitoring station sends an audio clip to the central processing station when the at least one of said keywords is detected for context analysis of the audio clip thereat.

35. An apparatus in accordance with claim 30, wherein:

the at least one monitoring station informs the central processing station when the at least one of said keywords is detected via a report.

36. A method in accordance with claim 30, wherein said written report provides both said airplay verification and said tracking of public relations matters.

* * * * *